United States Patent [19]
Ortiz

[11] Patent Number: 5,820,013
[45] Date of Patent: Oct. 13, 1998

[54] ADJUSTABLE SUPPORT APPARATUS FOR WAVE SOLDERING OF PRINTED CIRCUIT BOARDS

[75] Inventor: Jesus A. Ortiz, San Jose, Calif.

[73] Assignee: Innovative Soldering Technologies, Laguna Beach, Calif.

[21] Appl. No.: 673,061

[22] Filed: Jul. 1, 1996

[51] Int. Cl.[6] .................................................. B23K 3/00
[52] U.S. Cl. ............................. 228/43; 228/39; 118/503
[58] Field of Search ................................. 228/37, 43, 39; 269/903; 118/503

[56] References Cited

U.S. PATENT DOCUMENTS

| | | | |
|---|---|---|---|
| 4,030,717 | 6/1977 | Serlovsky | 269/118 |
| 4,948,108 | 8/1990 | Sullivan | 269/903 |
| 5,067,648 | 11/1991 | Cascini | 228/47 |
| 5,454,505 | 10/1995 | Kearns | 228/39 |
| 5,456,402 | 10/1995 | Curtin | 228/43 |
| 5,540,376 | 7/1996 | Asla et al. | 228/37 |

OTHER PUBLICATIONS

IBM Technical Disclosure Bulletin, vol. 34, No. 2, pp. 356–357, Jul. 1991.

*Primary Examiner*—Kenneth J. Ramsey
*Attorney, Agent, or Firm*—Thomas Schneck; George B. F. Yee

[57] ABSTRACT

A fixture for supporting printed circuit (PC) boards during wave soldering includes a rigid frame having a ledge formed along the inner perimeter of the frame. The ledge supports a PC board along a peripheral portion of the board. Channels are formed atop the frame for receiving slidably removable clamps. The fixture further includes a slidably removable rail coupled to the frame along its channels. The rail includes a ledge that is coplanar with the ledge of the frame. The rail can be adjusted to provide support for smaller PC boards. A drop-plate component includes a recessed area for receiving a PC board, and depressed regions for masking components on the board. Openings formed in the drop-plate expose desired areas of the board for soldering. The drop-plate, loaded with a PC board, fits into the frame along the ledges of the frame and/or the rail for a wave soldering operation.

20 Claims, 7 Drawing Sheets

ADJUSTABLE SUPPORT APPARATUS FOR WAVE SOLDERING OF PRINTED CIRCUIT BOARDS

TECHNICAL FIELD

The present invention relates generally to wave soldering and more specifically to fixtures for supporting printed circuit boards during a wave soldering operation.

BACKGROUND OF THE INVENTION

Wave soldering involves carrying a printed circuit (PC) board over a bath of molten solder. This is generally accomplished by a rigid frame which supports the PC board above the solder bath while being transported across the length of the bath by a conveyor mechanism.

An important aspect of a fixture used for wave soldering is the ability to accommodate a variety of sizes of PC boards. Numerous fixtures have been described which have adjustable support elements. For example, U.S. Pat. No. 4,030,717 discloses parallel longitudinal bars having grooves for receiving opposite edges of a PC board. The bars are attached to a frame through the use of screws which extend through the frame and are tightened into tapped holes in the bars. The bars are adjusted by loosening the screws, sliding the bars into position to grip the edges of a PC board and tightening the screws. The frame disclosed in U.S. Pat. No. 4,948,108 employs a similar arrangement of parallel longitudinal bars. The bars are held in place by the use of wing nuts. Opposite edges of a PC board rest upon grooves formed on the bars, and are held in place by wing clamps tightened by thumb bolts.

During a wave solder operation, the PC board is subjected to high temperatures. The heat tends to cause some sagging in the board. In the case of PC boards having a large surface area, the degree of sagging is significant; more so when the board is fully loaded with components. The above-described frames may not provide adequate support for such boards since they only provide support on opposite edges of the board. The frame shown in U.S. Pat. No. 5,067,648 provides improved support. It incorporates support members which are slidably fixed to other support members. A plurality of clips are attached to the support members and can be adjusted along the lengths of the support members. Each clip has a groove to receive a portion of an edge of a PC board. Wing nuts or thumbscrews are used to tighten down the supports and the clips. A PC board is mounted by adjusting the support members to the size of the board and maneuvering the clips to catch the edges around the board. Although support is provided along the periphery of the board, the clips of the '648 patent engage only a small portion of the edge of the board. Any warpage or sagging of the board could easily cause the board to become dislodged from the clips.

The problem with sagging is amplified in the case of double-sided boards. Double-sided PC boards have components mounted on both sides of the board. PC boards which incorporate surface mount technology (SMT) devices typically are double-sided. There are two approaches for manufacturing SMT boards. In one approach, a first side is screenprinted and subjected to an infrared (IR) convection reflow step to affix the components to the first side. Components are then placed on the second side and held in position with an epoxy compound. The second side is then subjected to a wave soldering operation. Processing the second side of an SMT board is made difficult because the weight of the components on the first side causes sagging of the board. U.S. Pat. No. 5,456,402 discloses a method of supporting such PC boards. The frame of the fixture in the '402 patent supports an SMT board along the edges of the board, and includes vertical support members which extend from the sides of the frame to contact the underside of the board. The vertical members, therefore, provide the additional support needed to maintain the board in a flat condition.

A preferred method of fabricating double-sided PC boards is to perform screenprint and reflow operations on each of the two sides of a board. However, a wave solder step typically is still required to solder other hardware such as connectors onto the board. In this case, the components soldered in the reflow steps must be masked to prevent damage to them during the subsequent wave solder operation. A water soluble glue is generally used to protect the surface mount devices. The use of water soluble compounds as a mask requires extra care to avoid contaminating the board during both the application of the glue and the subsequent removal of the glue. More importantly, the masking operation is a costly procedure. First, it is labor intensive because the mask must be carefully applied and then completely removed. Second, the material is not reusable and must be thrown away.

Prior art support frames such as those described above are not ideally suited for use in a production facility. The numerous adjustments to the various support members and holding clips needed to manipulate the device are time-consuming. The prior art support frames consist of numerous pieces of hardware such as support members, wing nuts, thumb bolts and so on. As the frames are used over time, pieces of the frame will be misplaced and become lost. This adds to manufacturing costs. Maintenance costs are high as well, since replacement of the prior art frames typically requires discarding the entire frame and purchasing a new frame.

As noted above, prior art support frames are not readily adapted for wave soldering of double-sided boards. Either the frame provides insufficient or unreliable support, or the construction of the frame does not permit its use in wave soldering applications. For example, the vertical support members of the '402 patent, being disposed beneath the PC board to support it, precludes its use in a wave solder machine.

What is needed is a support apparatus which can reliably support boards of any size, including double-sided boards, for wave soldering. A support apparatus is needed which facilitates masking operations during manufacture of the board. What is also needed is a support apparatus which minimizes the number of loose parts, while at the same time provides flexibility in accommodating a variety of PC board dimensions. The support apparatus should be easy to use so that production time may be reduced. Maintenance of the support apparatus should be simple and cost effective.

SUMMARY OF THE INVENTION

The present invention provides a PC board support fixture having a frame which includes a supporting ledge formed along an inner perimeter of an opening in the frame, the ledge being part of a removable solder contacting member coupled to the bottom of the frame. The ledge supports a PC board along the periphery of the board. Thus, a PC board to be wave soldered simply is dropped in place on the ledges of the frame.

The present invention includes a sliding rail that fits within the open area of the frame. The rail includes a ledge that is coplanar with the ledge formed within the frame, and a rail clamp that allows the rail to be locked in position. Any size PC board can be easily accommodated by sliding the rail to fit the board, so that the board is supported on two or three of its sides by the ledge formed along the frame and on one side by the ledge formed along the rail.

The present invention further includes clamps which slidably engage channels formed in both the frame and the sliding rail. Each of the channels includes a one end, a rotatable biased gripping element which grips the lip of the channel. The clamp can be rotated to a first position, thus allowing the clamp to be inserted into the channel. The clamp is then rotated to a second position which causes the clamp to grip the lips of the channel to hold the clamp in position.

The clamps further include a pivotally attached downwardly biased member which is used to press a PC board against the ledge of the frame and/or the sliding rail, thus holding the board in position. Adjusting the clamps to hold the board in place is a trivial procedure; simply pivot the downward member over the board, allowing the downward bias to snap the clamp into position on top of the board. The clamps also can be used to hold certain components in place, preventing the components from being pushed out of their sockets by the turbulence of the solder bath.

When a clamp is not in use, the clamp can be lifted and rotated out of position, but remain disposed within the channel. Thus, there is no loose hardware that can become misplaced or otherwise lost, since the clamp remains fixed to the support.

The present invention further includes a drop-plate which provides selective wave soldering of a PC board by masking off selected areas of the board. A drop-plate may also be fashioned to provide simultaneous selective soldering for a plurality of smaller boards. The drop-plate also serves to provide vertical support for double-sided boards to avoid flexing during a wave solder operation. The use of a drop-plate eliminates the need for glue-based or tape-based masks, thus increasing production throughput and decreasing production cost.

The support apparatus of the present invention can be stacked to facilitate storage and transportation from one work station to the next during manufacture. The drop-plate, likewise, can be stacked.

BEST MODE FOR CARRYING OUT THE INVENTION

Figure 1:
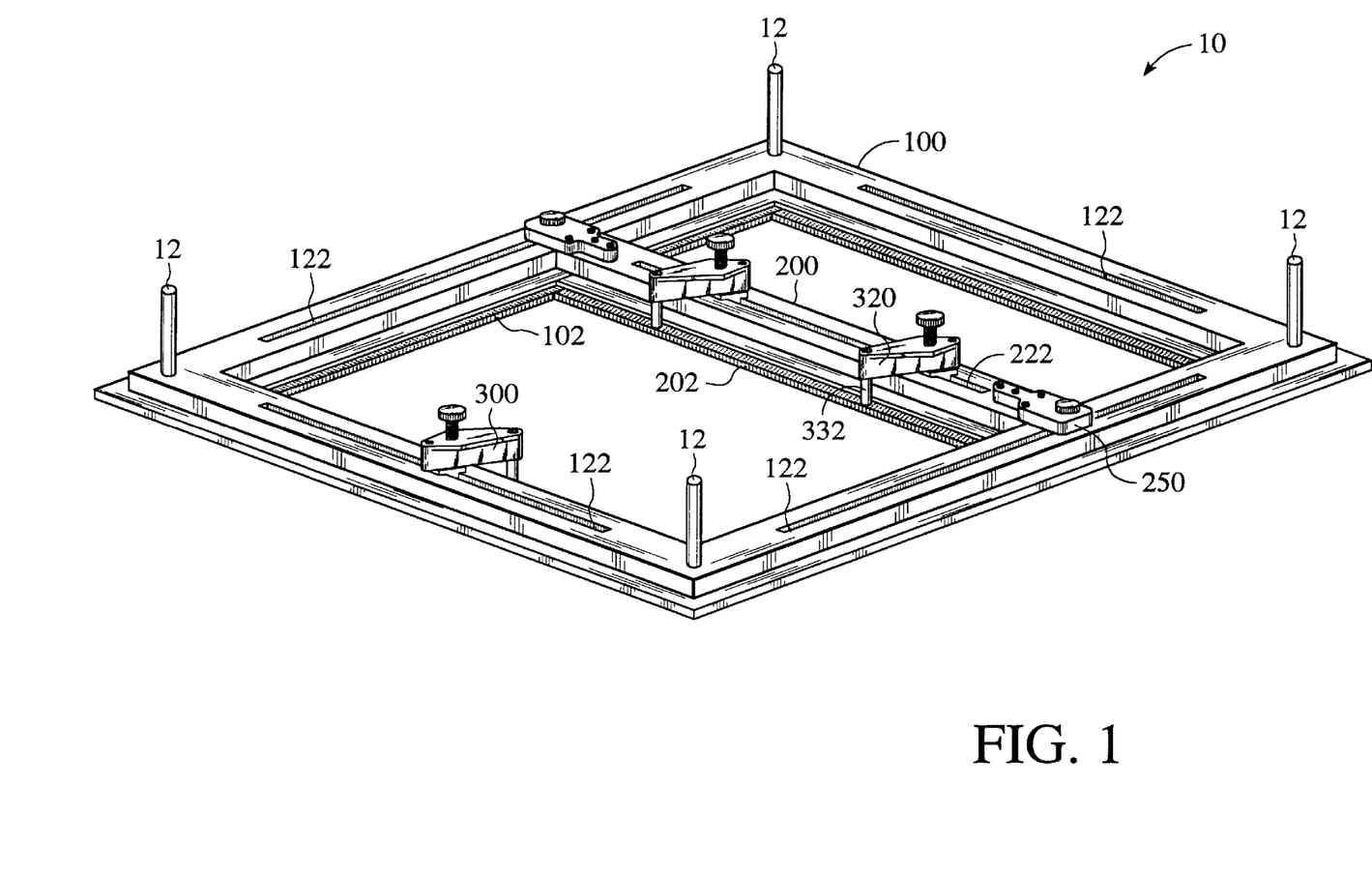
FIG. 1 shows a perspective view of the wave solder support apparatus of the present invention.

With reference to FIG. 1, a support 10 includes an open frame portion 100 having channels 122 formed therein and an inner perimeter on which a ledge 102 is formed. The ledge 102 encircles the inner perimeter of the frame 100. Although the frame 100 is shown as being generally rectangular in shape, the shape is not critical. The present invention will work equally well with any of a variety of shapes, including polygons such as a hexagon or an octagon.

A slidable rail 200 is fitted to the channels 122 and fastened to the channels by rail clamps 250. Like the frame 100, the sliding rail 200 includes its own channel 222. In addition, the sliding rail further includes a ledge 202 formed along each of the long sides of the rail. The ledges 102, 202 are coplanar.

A plurality of clamps 300 is received in the channels 122, 222. The number and placement of the clamps 300 is not critical, and will be determined by such factors as the size of the support apparatus 10 and the size of the PC board being supported.

Figure 4:
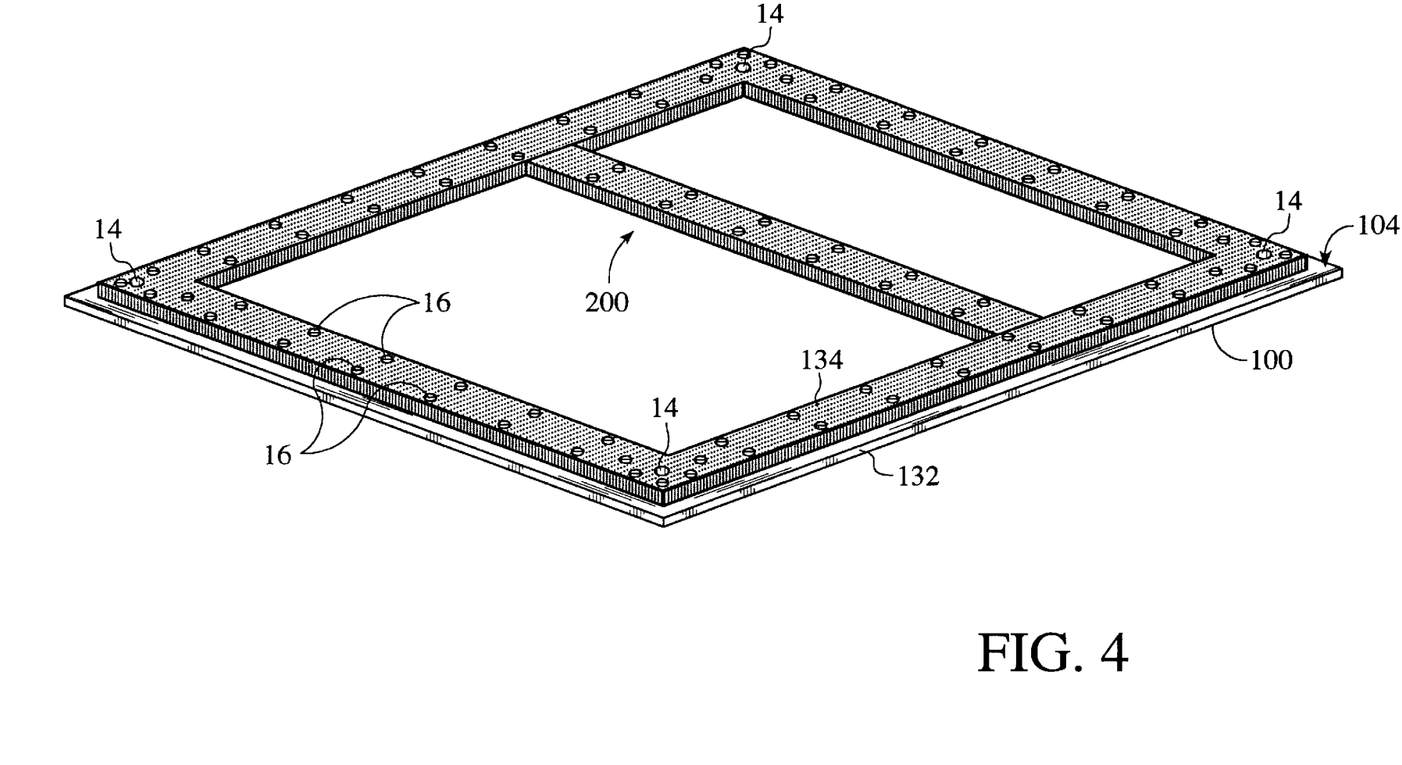
FIG. 4 shows the underside of the bottom portion of the frame of the support apparatus.

Stacking pins 12 are disposed at each of the corners of the frame 100. As with the clamps 300, the number and location of the stacking pins 12 will vary depending upon the size of the support apparatus 10. The stacking pins may need to be positioned somewhere between the corners of the frame 100 in order to avoid sagging of the frame 10. Turning to FIG. 4 for the moment, the bottom side of the frame is shown. Formed at the corners of the frame 100 are pin receptacles 14 vertically aligned with the stacking pins 12. This allows the apparatus of the present invention to be stacked by fitting the pins 12 of one board into the receptacles 14 of the next board.

The frame 100 and slidable rail 200 are generally formed of a fiberglass compound. This is a light, yet sufficiently stiff material for the purposes of the present invention. However, the specific material used is not critical to the practice of the invention, so long as the material provides a sufficient degree of stiffness to support a PC board.

Figure 2:
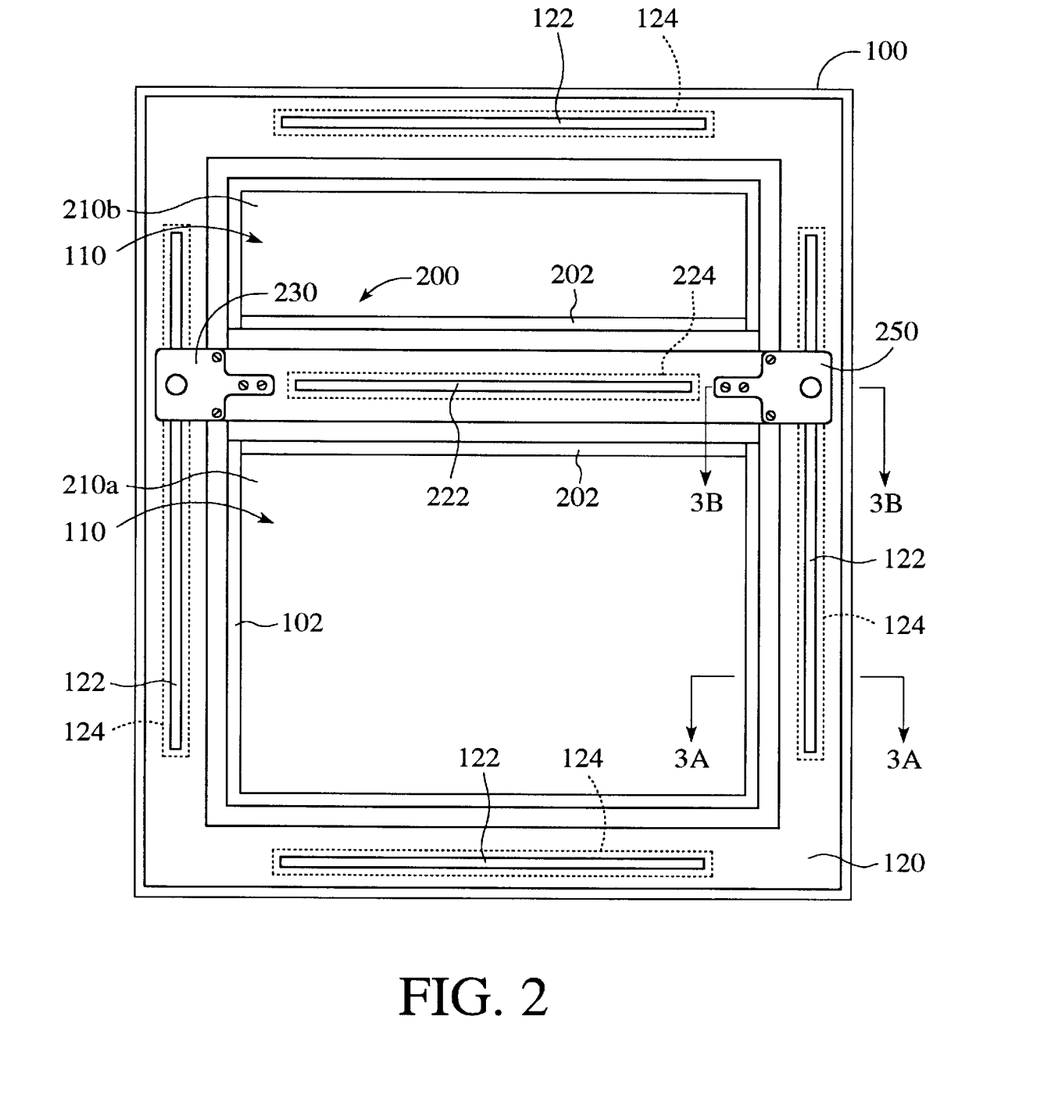
FIG. 2 is a top view of the frame and slidable rail of the support apparatus of FIG. 1.

Referring to FIG. 2, note that the ledge 102 formed along the frame 100 encircles the opening 110. The ledge 102 serves to support a PC board (not shown) along its periphery. The slidable rail 200 divides the opening 110 of the frame into two smaller openings 210A and 210B. The channels 102 extend along most of the perimeter of the frame 100. The openings 210A and 210B can therefore be adjusted to any desired width simply by sliding the rail 200. This allows a PC board of any size to be supported by the apparatus of the present invention using only two components, namely the frame 100 and the slidable rail 200. A PC board (not shown) is quite easily set into the frame simply by dropping the board onto the ledge 102 of the frame 100 and by adjusting the rail 200 so that the rail ledge 202 comes into contact with the board. Since the rail ledge 202 is coplanar with the frame ledge 102, full support for the PC board is provided.

Figure 3A:
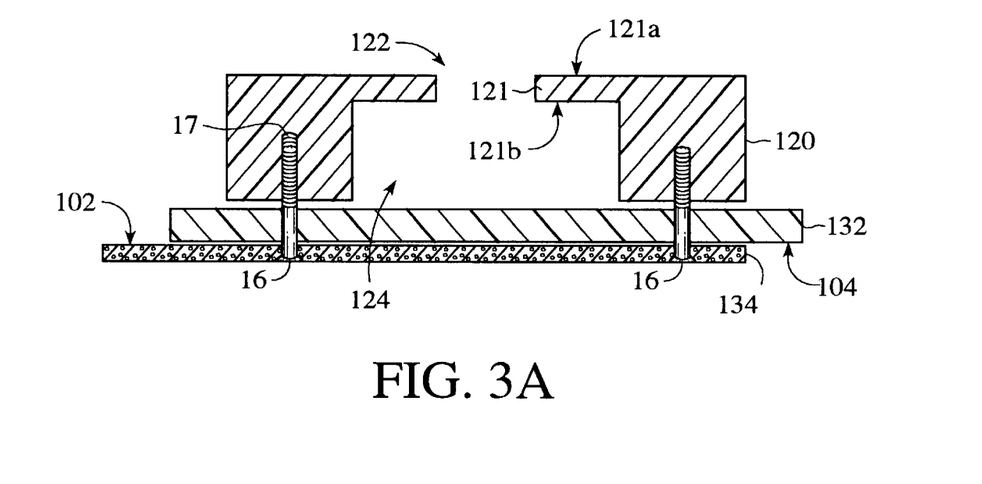
FIGS. 3A–3D show various side-sectional views of a channel formed into the frame of the support apparatus.

FIG. 3A shows the structure of the frame 100 in accordance with the present invention. The view in FIG. 3A is taken along the view lines 3A—3A as shown in FIG. 2. As can be seen in FIG. 3A, the frame consists of an upper body member 120 coupled to a lower body section. The lower body section includes an intermediate member 132 and a solder contacting member 134. Threaded screw holes 17 are drilled into the upper body member 120 so that the upper body member, intermediate member 132 and solder contacting member 134 are held together by screws 16, which are countersunk in the solder contacting member.

FIG. 3A further shows that the inside perimeter of the solder contacting member 134 is smaller than that of the intermediate member 132, thus defining the ledge 102. FIG. 3A further shows that the outside diameter of the intermediate member 132 is greater than that of the solder contacting member 134, thus defining a second ledge 104. FIG. 4 more clearly illustrates the ledge 104 formed around the outside perimeter of the frame 100. The ledge 104 supports the apparatus of the present invention upon a conveyer belt, or the like typically used in a wave soldering machine (not shown), to carry the apparatus across the solder bath.

FIG. 2 shows a set of channels (or guides) 122 formed into the frame 100. As shown in FIG. 3A, the channels 122 are openings into chambers 124 formed within the body of the frame. Each channel 122 includes a lip 121 having exterior and interior surfaces 121A, 121B. The lip 121 defines an opening into the chamber 124. The chamber 124 is defined by a cavity formed into the upper body member 120 and bounded by the intermediate member 132. Returning to FIG. 2, it can be seen that the sliding rail 200 also includes a channel 222 opening into a chamber 224 formed in the rail that is similar in construction to the chamber 124 of the frame 100.

Figure 3B:
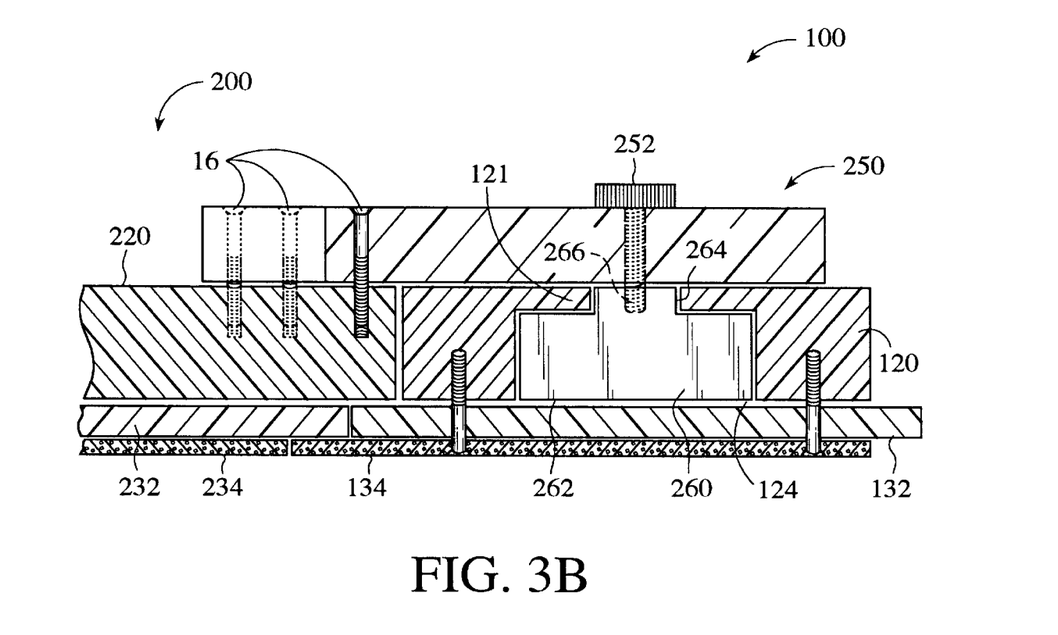

FIG. 3B shows a cross-sectional view of the frame 100 and the rail 200, as indicated by the view lines 3B—3B in FIG. 2, including the rail clamp 250. The rail 200 includes an upper body member 220 coupled to a lower body section, the latter including an intermediate member 232 and a solder contacting member 234. The ledge 202 of the rail is an exposed portion of the solder contacting member 234. The solder contacting layers 134, 234 of the frame and the rail are coplanar, and consequently so are the ledges 102, 202 as mentioned above.

FIG. 3B further shows the rail clamp mechanism 250 for fixing the rail 200 to the frame 100. The clamp 250 is secured at one end to the upper body member 220 of the rail by flush-mounted screws 16. The clamp 250 attaches at the other end to the frame by a thumbscrew 252 which tightens into a helicoil block 260. The helicoil block 260 fits within the chamber 124 formed in the frame 100. A body 262 of the helicoil block 260 has a width that exceeds the opening of the lip 121 of the chamber 124, and so remains confined within the chamber. The body 262, however, is small enough so that the block can be slid along the length of the chamber. A neck portion 264 of the helicoil block 260 extends through the opening of the lip 121 and slightly above the exterior surface 121A of the lip. The neck portion 264 includes a threaded opening 266 into which the thumbscrew 252 is tightened. In operation, the rail 200 is aligned with the helicoil block 260 so that the thumbscrew 252 can engage the opening 266 of the block. The thumbscrew 252 is tightened down to secure the rail to the frame 100.

Turn now to FIG. 4. As explained above, the lower body section consists of the intermediate member 132 and the solder contacting member 134. In accordance with the preferred embodiment of the invention, the intermediate member 132 is a fiberglass material. Note, however, that the use of fiberglass is not critical to the invention. It is preferred over other materials for its stiffness and durability. Similarly, the solder contacting member 134 must be durable since it comes into direct contact with the solder bath. More importantly, however, the solder contacting member must be electrostatically protected to prevent electrostatic discharges (ESD) from destroying the electronic components to be soldered. Preferably, the material is an electrostatic protective material, such as CDM (composite delmat), G-10, FR-4 or ECP. CDM is the preferred choice, both for its electrostatic protection and for being a durable material.

Figure 5:
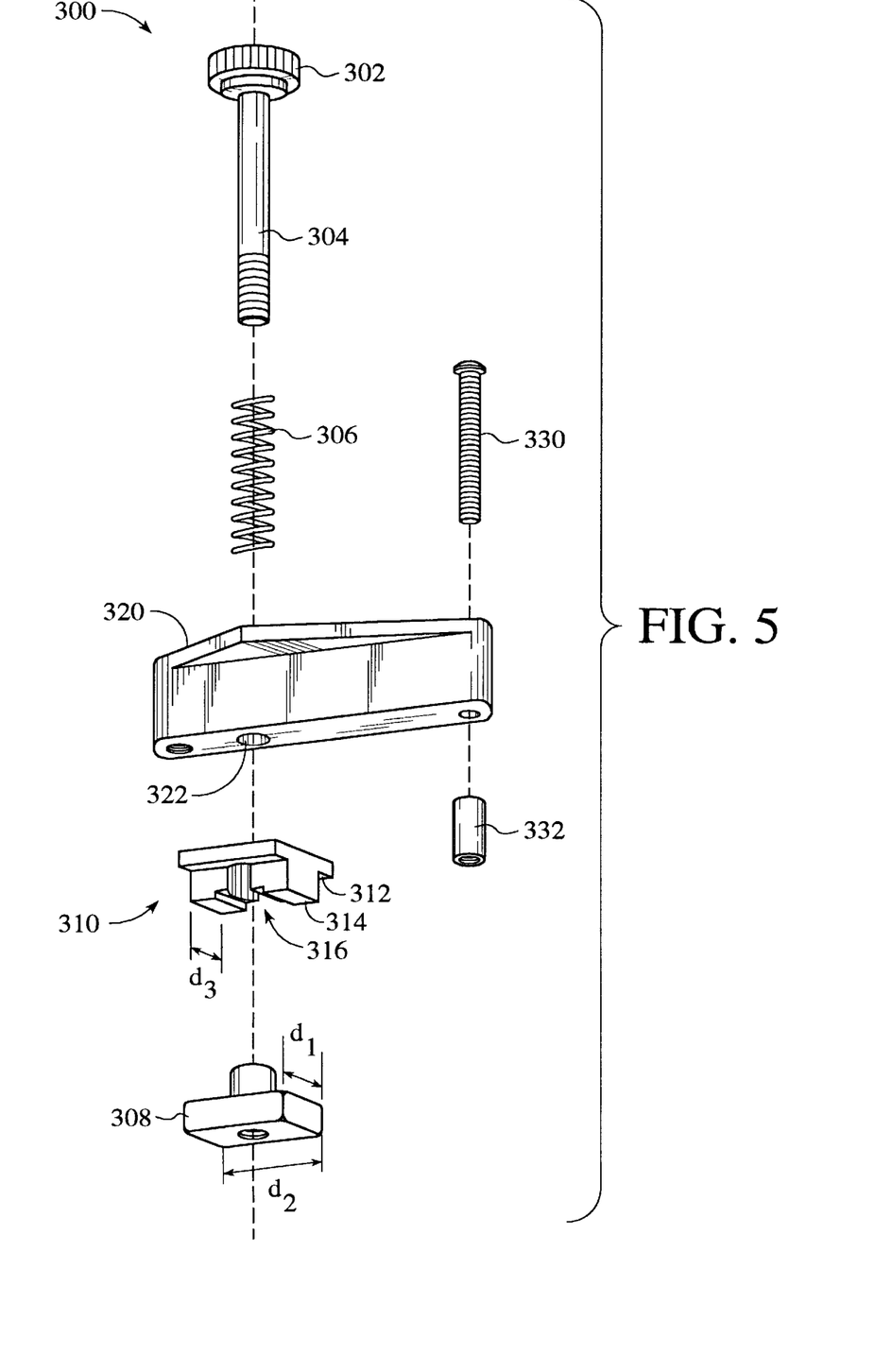
FIG. 5 is an exploded view of the clamp of the present invention.

The clamp shown in FIG. 5 includes a swingarm 320 having a clamping mechanism disposed at one end of the swingarm, and pivoting about the clamping mechanism is a pressing member 332 attached at the other end of the swingarm. The pressing member 332 is affixed to the swingarm 320 by a screw 330.

The clamping mechanism includes a thumbscrew 302 having a threaded shaft 304 which is fitted through a spring 306. The thumbscrew/spring combination is inserted through an opening 322 in the swingarm 320. The shaft 304 exits the swingarm, passes through an opening in a flanged bracket 310 and screws into a knobbed member 308. The flanged bracket 310 includes a flange 312 and a slotted bracket 314 defining a slot 316. The thumbscrew 302 and knob 308 are rotatable about an axis through the shaft 304 of the thumbscrew.

Figure 3C:
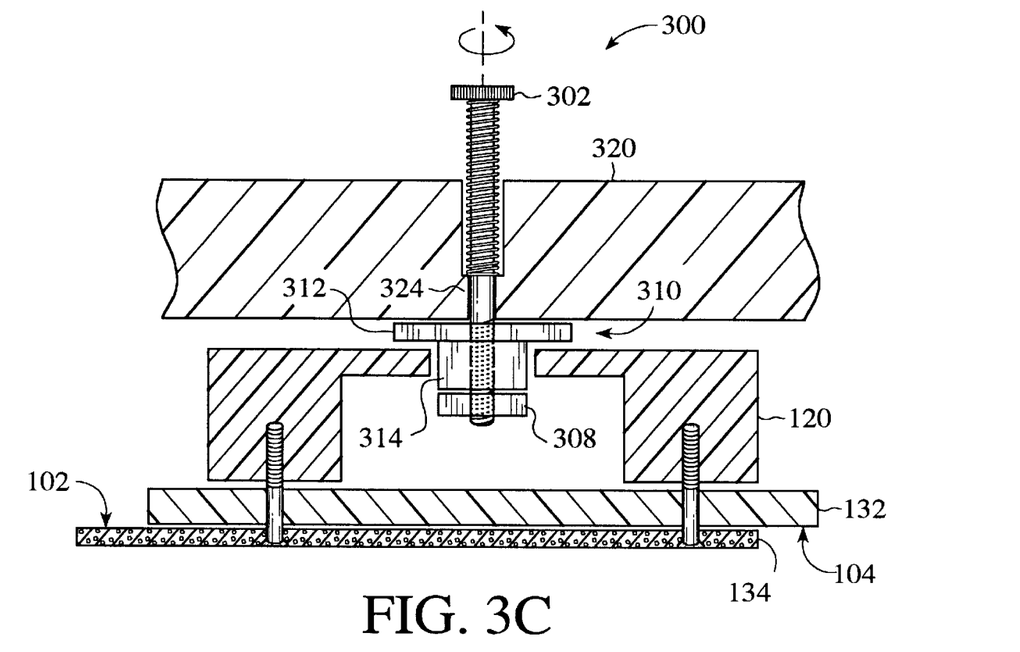
Figure 3D:
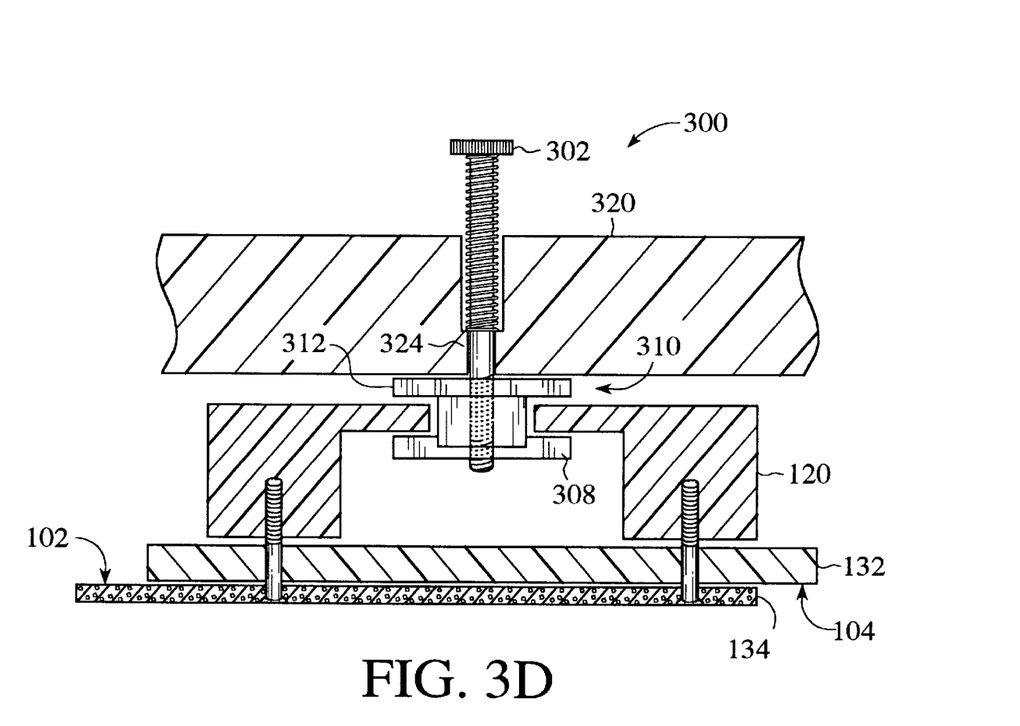

Turn now to FIGS. 3C and 3D for a discussion on the operation of the clamp mechanism. FIGS. 3C and 3D show a cross sectional view of the clamp 300 inserted into the frame 100. The flanged bracket 310 partially fits in the channel 122. More specifically, the slotted bracket 314 is dimensioned $d_3$ (FIG. 5) to fit through the opening of the lip 121 of the channel while the flange 312 sits atop the exterior surface 121A of the lip. The knob 308 has a first dimension $d_1$ which is less than the breadth of the opening of the lip. FIG. 3C shows the knob being rotated to a first position, allowing the knob to fit through the opening of the lip 121. When the thumbscrew 302 is rotated 90°, as shown in FIG. 3C, the knob 308 is rotated to a second position. FIG. 3D shows the knob in the second position. The knob is aligned with the slot 316 of the flanged bracket 310 along the knob's first dimension $d_1$, the slot 316 being wide enough and deep enough to partially receive the knob. In this position, a second dimension $d_2$ of the knob prevents the knob from passing the lip 121 of the channel 122, thus fixing the clamp 300 to the frame 100.

FIGS. 3C and 3D further show that the opening 322 in the swingarm 320 includes a seat 324 for the spring 306. The spring therefore is compressed between the seat 324 and the thumbscrew 302. In FIG. 3D, the potential energy of the compressed spring 306 provides a compressive force for gripping the lip 121 between the flange 312 and the knob 308, and by so doing the clamp 300 is fixed and securely held in position within the chamber 124 of the frame 100. By enclosing the clamps within the chamber 124, the clamps are protected against the damage that would be caused from exposure to the solder during a wave solder operation.

FIG. 1 shows that the sliding rail 200 has channels 222 similar to the channels 122 of the frame 100 for receiving clamps. FIG. 1 further shows that the pressing member 332 of the clamps are vertically aligned to the ledges 102, 202. The pressing member 332 serves to hold a PC board in position upon the ledges, during a wave soldering operation. The downward force for the pressing members 332 is provided by the bias of the spring 306, as the spring pushes against the seat 324 of the swingarm 320 as shown in FIG. 3C.

During a wave solder operation, it sometimes happens that turbulence in the solder bath pushes against the pins of some of the components with sufficient force to dislodge the components from the PC board. The preferred embodiment of the invention, therefore, includes swingarms 320 having a length sufficient to position the pressing member 332 over certain components on the PC board to hold the components in place during the wave soldering operation.

As can be seen in FIGS. 1 and 2, the clamps 300 may be repositioned anywhere along the length of the channels 122 and 222 simply by pressing down upon the thumbscrew 302 to momentarily disengage the knob 308 from the lip 121, sliding the clamp to a new position, and releasing the thumbscrew. In addition, the swingarm 320 allows the pressing member 332 to be swung out of the way during placement and removal of a PC board, allowing the clamp to remain attached to the channel 121. The clamp mechanism of the present invention is highly advantageous in that no tools are required to manipulate the clamp. This avoids having tools and pieces of unused clamps lying about with the possibility of getting misplaced, as is the case with some prior art support fixtures.

Figure 6A:
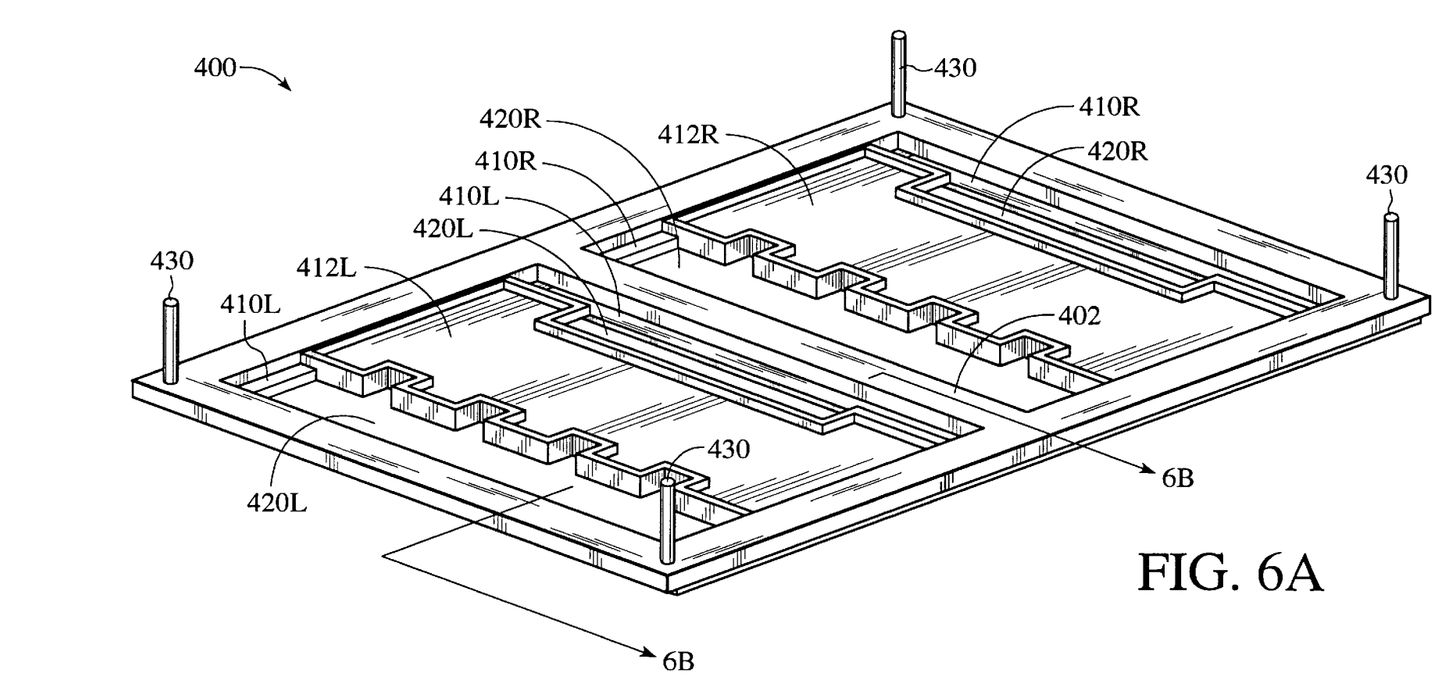
FIGS. 6A and 6B are perspective and cut-away views, respectively, of the drop-plate component of the present invention.
Figure 6B:
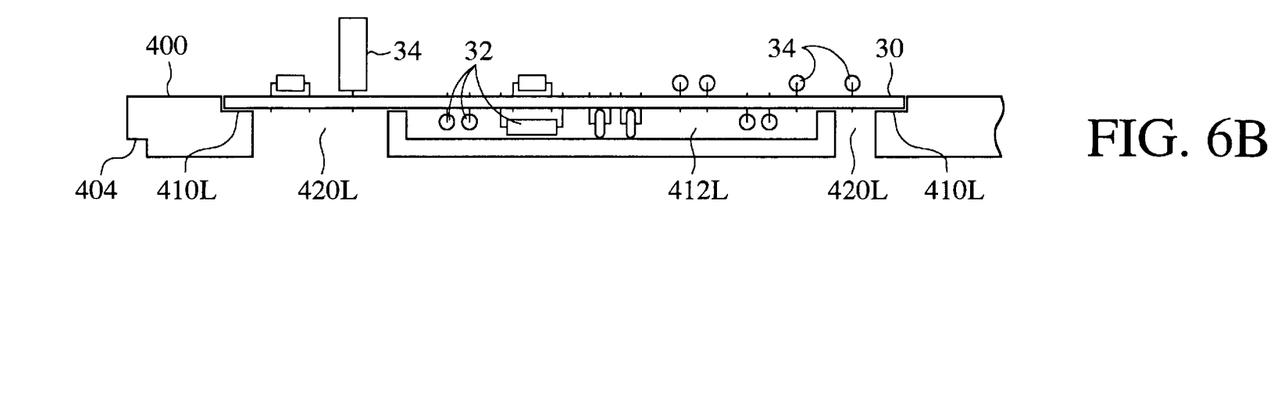

Another aspect of the invention is the drop-plate component shown in FIGS. 6A and 6B. The top surface 402 includes left and right recessed regions 410L, 410R respectively, each for receiving a PC board (not shown). The recessed region 410L(R), in turn, includes one or more depressed areas 412L(R) for accommodating components soldered to the board. The depressed areas therefore serve to mask those components during a wave solder operation. One or more openings 420L(R) are formed through the drop-plate 400 for exposing selected areas of the board to the wave solder.

FIG. 6B shows a cross-sectional view of the drop-plate 400 taken along the view line B—B. A PC board 30 is shown received within the recessed region 410L. Certain of the components 36 are received within the depression 412L formed in the recessed region 410L. Additional components 34 to be soldered are exposed through the openings 420L of the drop-plate 400. FIG. 6B further show an edge 404 formed along the perimeter of the drop-plate. Used according to the invention, the drop-plate 400 is received in the opening 110 of the frame 100, or in one of the smaller openings 210A, 210B if the slidable rail 200 is installed. The edge 404 of the drop-plate is supported upon the stepped ledges 102, 202 of the frame 100 and the slidable rail 200, respectively.

The drop-plate 400 shown in FIG. 6A shows two identical recessed regions 410L, 410R for receiving PC boards. It should be noted, however, that this arrangement is not critical. The drop-plate may have a single recessed region for receiving one PC board, instead. Alternatively, more than two recessed regions may be formed for receiving a multitude of smaller PC boards. In addition, a multitude of recessed regions may be defined for receiving differently sized PC boards. In general, the number and shape of the recessed regions will depend upon the particular boards being manufactured.

With respect to the depressed areas 412L, 412R and the openings 420L, 420R formed in the recessed regions 410L, 410R, their numbers and shapes will vary depending upon the areas of the PC board for which wave soldering is desired. For example, additional openings may be formed through the recessed region to expose the desired areas of a PC board to be soldered. Consequently, additional depressed areas will be needed to mask the components to be protected.

The drop-plate offers advantages over the conventional glue and tape masks in the case of double-sided boards. The depressed areas 412L, 412R serve as effective masks, while avoiding the subsequent clean-up steps needed to remove conventional glue and tape masks. In addition, the drop-plate provides support for the double-sided PC board, not possible with glue and tape masks, and by so doing prevents sagging of the board.

FIG. 6A further shows a set of stacking pins 430 disposed at the corners of the drop-plate 400. Although not shown, the bottom side of the drop-plate include corresponding receptacles for receiving the stacking pins 430. Like the stacking pins 12 of the frame shown in FIG. 1, the placement of the stacking pins 430 on the drop-plate is not critical, so long as the drop-plates can be stacked without sagging.

I claim:

1. A pallet for carrying printed circuit boards during a wave soldering operation comprising:

a frame having a removeable solder contacting member disposed on a bottom of said frame, said frame further having an opening defined by an inside perimeter and further having a stepped ledge formed along said inside perimeter;

a plurality of rail guides formed in said frame, each of said rail guides having an enclosed chamber and a lip opening into said chamber, said lip formed about an upper perimeter of said chamber, said lip having an exterior surface and an interior surface opposite said exterior surface; and a plurality of clamp members, each of said clamp members having a rotatable gripping means for gripping said lips, said gripping means having a first rotated position to allow said gripping means to be inserted into said rail guides, said gripping means further having a second rotated position to grip said exterior and interior surfaces of said lips, each of said clamp members further having a downwardly directed and downwardly biased member pivotally attached to said gripping means and extending over said opening of said frame;

whereby said ledge receives peripheral portions of a printed circuit board and said downwardly directed members of said clamp members press down upon said peripheral portions and components of said printed circuit board, thereby holding said printed circuit board and said components in place during wave soldering.

2. The pallet of claim 1 wherein said gripping means includes a biasing element to provide a gripping force when said gripping means is rotated to said second rotated position.

3. The pallet of claim 1 further including a slidable support member engaged to said rail guides, said support member having a stepped ledge formed along a bottom portion thereof, said ledges of each of said frame and said support member being coplanar for receiving a printed circuit board thereupon, said support member further having a rail guide for receiving said clamp members.

4. The pallet of claim 3 wherein said frame includes an upper body coupled to a lower body, said rail guide formed in said upper body, said solder contacting member detachably coupled to said lower body, whereby said solder contacting member may be periodically replaced.

5. The pallet of claim 4 wherein said solder contacting member is electrostatically protective material.

6. The pallet of claim 4 wherein said upper body of said frame includes stacking pins disposed thereon and said lower body includes notches vertically aligned with said stacking pins, whereby a first and a second pallet may be stacked by aligning and fitting stacking pins of said first pallet with notches of said second pallet.

7. The pallet of claim 3 further including a drop plate having an outer peripheral portion for contacting said ledges of each of said frame and said slidable support and further having a first recessed area encircled by said outer peripheral portion for supporting a printed circuit board, said first recessed area including depressions for receiving components on said printed circuit board and further including openings to expose selected areas of said printed circuit board through the bottom side of said drop plate, whereby said exposed selected areas of said printed circuit board are subjected to a solder bath during a wave soldering operation.

8. The pallet of claim 7 wherein said drop plate includes a second recessed area for supporting a second printed circuit board, said first and second recessed areas having different areal dimensions.

9. The pallet of claim 8 wherein said drop plate further includes opposed first and second major surfaces, said first major surface includes stacking pins disposed thereupon and said second major surface includes notches vertically aligned with said stacking pins, whereby a first and a second drop plate may be stacked by aligning and fitting stacking pins of said first drop plate with notches of said second drop plate.

10. A device for supporting a printed circuit board during wave soldering, said device comprising:
    a frame having a bottom member, said bottom member having an outer perimeter, an inner perimeter encircling an open region, and a first edge formed along said inner perimeter, said frame further having a top member disposed atop said bottom member and further being circumferentially disposed between said outer and inner perimeters, said top member having elongate chambers formed therein and further having elongate lips opening through an upper surface of said top member into said elongate chambers;
    an elongate rail having means for removably and slidably engaging said lips, said rail being disposed within said open region thereby dividing said open region into first and second apertures, said rail having a bottom side and second edges formed along long sides of said bottom side, said second edges being coplanar with said first edge; and
    a clamp having means for engaging said elongate lips and means for pressing in a downward direction, said means for engaging having a first position for insertion thereof into said chambers and a second position for contacting a bottom surface of said lips, thereby slidably and removably mounting said clamp within said elongate chambers;
    whereby said first and second edges within said first aperture receive a circumferential portion of a first printed circuit board for support thereof and said first and second edges within said second aperture receive a circumferential portion of a second printed circuit board, said first and second printed circuit boards being held in position upon said edges by said means for pressing and further being exposed through said first and second apertures respectively for wave soldering.

11. The device of claim 10 wherein said means for engaging includes a sleeve having a flanged end, a plunger received through said sleeve, said plunger having a compressive bias element and further having a knobbed end, said sleeve being dimensioned to fit between said elongate lips, said flanged end having a width exceeding a breadth of said elongate lips, said knobbed end having a first lateral dimension less than said breadth of said elongate lips for insertion into said chamber and a second lateral dimension greater than said breadth of said elongate lips, whereby said knobbed end contacts said bottom surface of said lip due to a compressive bias of said plunger when said means for engaging is set to said second position, allowing said lips to be securely engaged between said flanged end and said knobbed end.

12. The device of claim 10 wherein said clamp includes a swing arm which couples said means for engaging to said means for pressing to allow said means for pressing to swivel about said means for engaging.

13. The device of claim 10 wherein said elongate rail includes a chamber formed therein and elongate lips opening through an upper surface of said elongate rail.

14. The device of claim 10 further including a drop plate supported upon said first edge and/or said second edge, said drop plate having a recessed area for receiving a component side of said printed circuit board, said recessed area having openings therethrough, whereby selected areas of said printed circuit board may be exposed through said drop plate.

15. The device of claim 10 wherein said bottom member further includes an upper portion and a lower portion removably attached to said upper portion, said upper portion having an inside perimeter that exceeds an inside perimeter of said lower portion, said first edge thereby being defined by said inside perimeter of said lower portion, said lower portion being removable from said upper portion.

16. The device of claim 15 wherein said lower portion is electrostatically protective material.

17. A fixture for holding printed circuit boards on a conveyer in a wave soldering machine, said frame comprising:
    a frame having a generally rectangular shape and further having a first support surface disposed along the entirety of an interior perimeter of said frame;
    grooves formed through the top of said frame, each of said grooves having a lip opening into said groove;
    an elongate rail slidably and removably secured to said grooves on opposite sides of said frame, said rail having a second support surface coplanar with said first support surface;
    a plurality of clamps;
    each clamp including a sleeve having a flanged end, a plunger received through said sleeve, said plunger having a compressive bias element and further having a knobbed end for insertion into said grooves, said sleeve being dimensioned to fit between lips of said grooves, said flanged end having a width exceeding a breadth of said lips, said knobbed end having a first lateral dimension less than said breadth of said lips and a second lateral dimension greater than said breadth of said lips, whereby a compressive force provided by said bias element allows said lips to be slidably and removably clamped between said flanged end and said knobbed end;
    each clamp further including a downwardly extending member having a downward bias, said downwardly extending member being pivotally attached to said sleeve and further being spaced apart from said sleeve and vertically aligned with respect to said first support surface, whereby a printed circuit received upon said first support surface is pressed down upon and held in place by said downwardly protruding members.

18. The fixture of claim 17 wherein said elongate rail includes:
    a slide block secured at each end of said rail;
    a helicoil block disposed within one of said grooves, said helicoil block having a neck portion which protrudes above said lip, said neck portion having a threaded well; and
    a screw means for fastening said slide block to said helicoil block.

19. The fixture of claim 17 further including a removable bottom member attached to an underside of said frame, said bottom member being electrostatically protective material.

20. The fixture of claim 17 further including a drop plate supported upon said first and second support surfaces along peripheral portions of said drop plate, said drop plate having a recessed area for receiving a printed circuit board and further having openings therethrough, whereby selected areas of said printed circuit board may be wave soldered.

* * * * *

UNITED STATES PATENT AND TRADEMARK OFFICE
CERTIFICATE OF CORRECTION

PATENT NO : 5,820,013
DATED : Oct. 13, 1998
INVENTOR(S) : Jesus A. Ortiz

It is certified that error appears in the above-identified patent and that said Letters Patent is hereby corrected as shown below:

Col. 3, line 9, one full line was omitted. Before the word "one" insert -- lip that opens into a chamber. The clamps include, at --.

Claim 8, col. 9, line 8, "different areal dimensions." should be -- different area dimensions. --.

Signed and Sealed this

Twenty-fourth Day of August, 1999

Attest:

Q. TODD DICKINSON

Attesting Officer

Acting Commissioner of Patents and Trademarks